United States Patent
Linnartz

[19]
[11] Patent Number: 6,131,161
[45] Date of Patent: *Oct. 10, 2000

[54] MARKING A DIGITALLY ENCODED VIDEO AND/OR AUDIO SIGNAL

[75] Inventor: Johan P. M. G. Linnartz, Eindhoven, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/723,653

[22] Filed: Oct. 3, 1996

[30] Foreign Application Priority Data

Oct. 4, 1995 [EP] European Pat. Off. .............. 95202673

[51] Int. Cl.[7] ................................. G09C 5/00; H04L 9/00
[52] U.S. Cl. ..................... 713/176; 380/200; 380/201; 380/287; 380/51; 380/54; 380/55; 713/150; 713/168; 382/232; 382/282
[58] Field of Search ....................... 380/3, 4, 5, 9, 380/10, 11, 12, 13, 14, 15, 16, 17, 18, 19, 20, 49, 50, 51, 54, 55, 59, 200, 201, 203, 287; 382/232, 276, 282, 283; 713/150, 168, 176, 177–179, 200, 201

[56] References Cited

U.S. PATENT DOCUMENTS

| | | | |
|---|---|---|---|
| 5,267,153 | 11/1993 | Shimura et al. | 382/232 |
| 5,416,606 | 5/1995 | Katayama et al. | 382/232 X |
| 5,488,664 | 1/1996 | Shamir | 380/54 |
| 5,530,759 | 6/1996 | Braudaway et al. | 380/54 |
| 5,664,018 | 9/1997 | Leighton | 380/54 |
| 5,732,157 | 3/1998 | Osawa | 382/232 X |
| 5,748,783 | 5/1998 | Rhoads | 380/4 X |

*Primary Examiner*—Bernarr E. Gregory
*Attorney, Agent, or Firm*—Laurie E. Gathman

[57] ABSTRACT

An electronic watermarking scheme is proposed that can significantly increase the security of copy protection mechanisms. The watermarking methods works at high level in the hierarchy of the (MPEG) source signal. This ensures that the watermark is easily detectable, but difficult to erase without significant transcoding effort. Such transcoding is considered a difficult and expensive task that may furthermore lead to loss of quality or increase in bit rate.

15 Claims, 2 Drawing Sheets

MARKING A DIGITALLY ENCODED VIDEO AND/OR AUDIO SIGNAL

BACKGROUND OF THE INVENTION

The invention relates to a method and arrangement for marking a digitally encoded video and/or audio signal so as to classify said signal as authentic programme material. The invention also relates to an arrangement for decoding said marked signal and a recording medium on which said marked signal has been recorded.

Video and audio signals are increasingly transmitted and recorded in a digitally encoded form, for example, an MPEG bitstream. There is a growing need to accommodate a marker in said signal so as to classify the signal as authentic programme material. Marking digital signals is particularly useful in copy protection applications. The mark, also referred to as watermark, can effectively take the form of a single bit indicating that the signal constitutes copy protected material, or a multi bit code representing the originator of the material. Watermarking is comparable to placing an electronic stamp on the video and audio material.

In the known MPEG standard for audio and video compression a copy protection bit has been defined for that purpose. However, a disadvantage of this known method is that the protection bit can easily be detected and then modified so as to circumvent a copyright protection mechanism.

SUMMARY OF THE INVENTION

It is an object of the invention to provide a method which renders it possible to easily detect a watermark but difficult to erase it.

According to the invention, the method is characterized by the step of assigning a predetermined value to a predetermined coding parameter which, when modified, requires a plurality of further parameters to be modified in order to correctly decode said video signal.

The invention is based on the insight that a compressed audio or video signal (e.g. an MPEG bitstream) comprises a plurality of coding parameters. The value of many coding parameters can easily be detected without decoding the bitstream. However, modification of some parameters generally leads to a bitstream which no longer fulfills the prescribed format (e.g. the MPEG syntax), or leads to errors in the decoding process. Thus, a watermark which has been obtained by assigning a predetermined value to such a coding parameter can easily be detected but not modified, i.e. erased. Modification of the watermark requires the signal to be first decoded into the pixel domain and then re-encoded into a new bitstream. This operation leads to loss of quality, unless expensive encoding equipment is used.

In an embodiment of the invention, the predetermined coding parameter is the number of slices in selected MPEG encoded video frames. Selected frames may include all frames or frames of a certain type (I,P,B) only. Selected frames may also means the first I-frame of a GOP.

Usually, the number of slices in a video frame varies with the video contents. According to the invention, the number of slices is controlled in advance. The watermark is thus generated by forcing the encoder to generate a predetermined number of slices. The number of slices is not necessarily fixed. The number of slices may also forced to be an integral multiple of an integer N. In a preferred embodiment of the invention, the number of slices is forced to be an integral multiple of N and an integral multiple of M in alternating selected frames. The probability that a "normal" encoder will produce such a number of slices is extremely small, even if the input signal is stationary.

Further examples of suitable coding parameters are quantization matrix settings, the PES packet length of an MPEG bitstream, or the sequence of intraframe (I), predictively encoded (P) and bidirectionally encoded (B) frames in an MPEG signal.

DETAILED DESCRIPTION OF THE PREFERRED EMBODIMENTS

Figure 1:
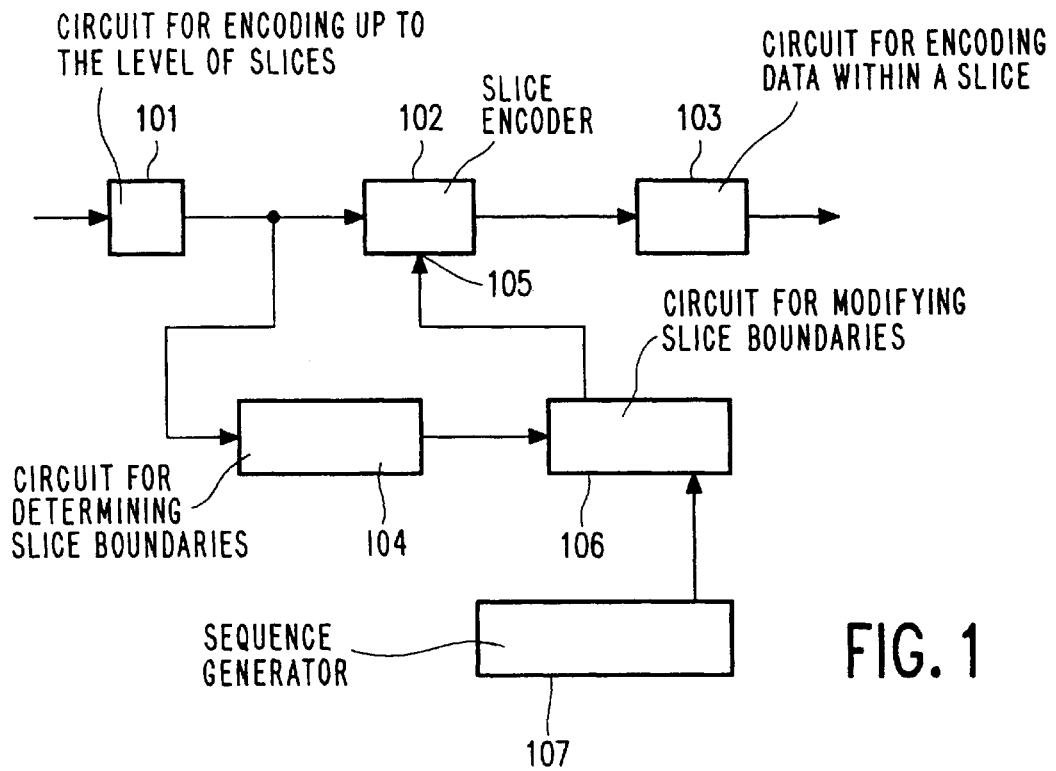
FIG. 1 shows an encoder according to the invention.

FIG. 1 shows an encoder according to the invention. Reference numeral 101 denotes circuitry for encoding a video sequence up to the level of slices, reference numeral 102 denotes a slice encoder, and reference numeral 103 denotes circuitry for encoding picture data within a slice. Reference numeral 104 denotes a circuit for determining slice boundaries. The circuits 100–104 are part of a conventional MPEG encoder and need no further explanation. In the conventional MPEG encoder, the slice boundaries are determined by the video source material and directly applied to an input 105 of slice encoder 102. The bitstream produced by the encoder comprises a frame start header F at the beginning of each flame and a slice start code S at the beginning of each slice.

In the encoder shown in FIG. 1, the slice boundaries are modified by a slice boundary modifying circuit 106. The slice boundaries are now selected in response to a signal which is generated by a sequence generator 107. This signal determines the number of slices in each frame. In the present embodiment, the sequence generator alternately produces an integer n and an integer m in such a way that n mod N=0 and m mod M=0. N and M can be 3 and 7, respectively. Accordingly, the number of slices is forced to be an integer multiple of 3 and 7 in alternate frames. This particular pattern represents a watermark. It is very unlikely that a conventional MPEG encoder produces a bitstream having said number of slices per frame. In addition hereto, the encoder can also adapt the quantization scale values more frequently than needed for the particular source material. This makes it more difficult for a hacker to modify the number of slices.

Figure 2:
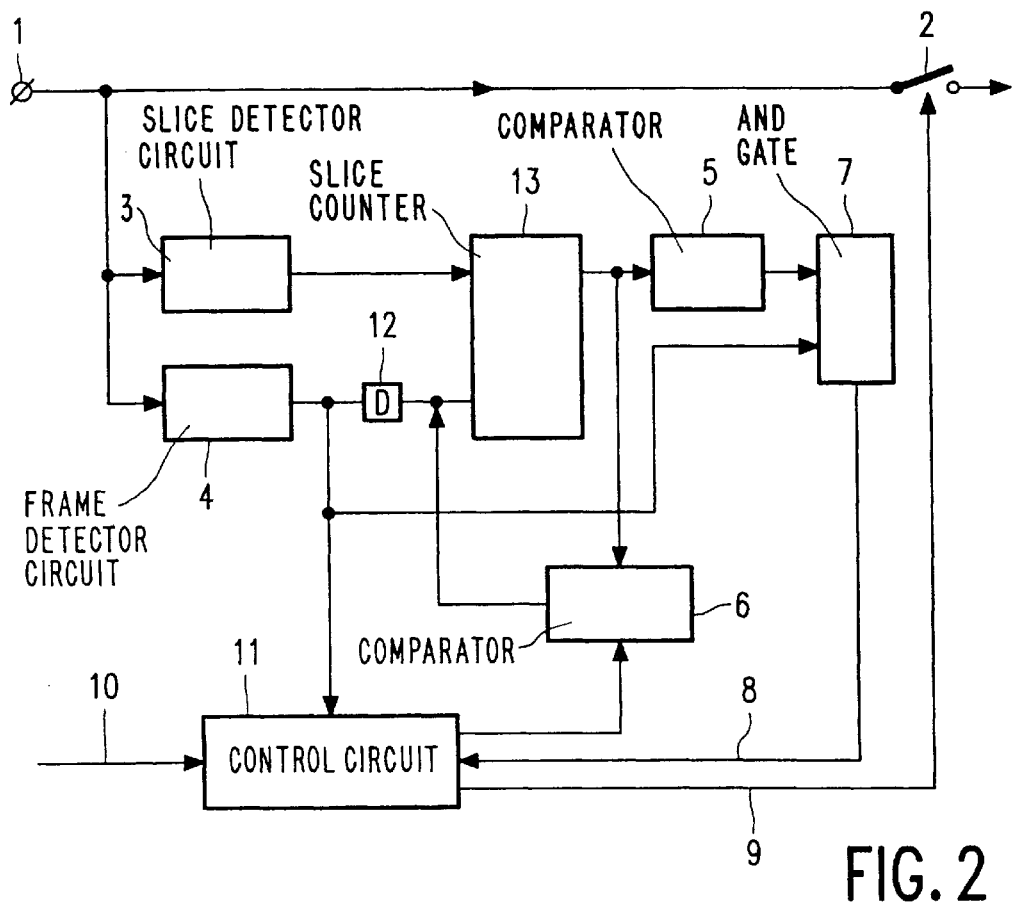
FIG. 2 shows a decoder according to the invention.

FIG. 2 shows a decoder according to the invention. An MPEG bitstream at input 1 is transferred to the output whenever switch 2 is closed. Switch 2 is controlled by a block signal 9. A slice detector circuit 3 detects the presence of a slice start code S in the MPEG bitstream. Similarly, a frame detector circuit 4 detects the presence of a frame start header F. A counter 13 counts the number of slices in each frame. The counter is reset at the start of a new frame via a delay 12. A comparator 6 resets the counter 13 if the output equals a modulus value which is applied by a control circuit 11. In view of the description of the encoder it will be appreciated that the modulus value is N and M for alternate frames. Hence, counter 13 alternately behaves as a mod N and a mod M counter. A further comparator 5 outputs a one if its input is zero. An AND gate 7 generates a pulse signal 8 if the counter state is zero when a new frame starts. Delay 12 ensures that the zero detection is performed before the counter 13 is reset by the frame start header. Control circuit 11 checks whether, over a period of a certain number of frames, the number of slices per frame mod N behaves according to the rules that are specific for a copy marked image.

If the bitstream is copy protected, control circuit 11 checks whether also an authenticate signal 10 is present. If the signal is copy protected, but no authenticate signal is present, the MPEG signal is an illegal copy. In such case, control circuit 11 opens switch 2 and the MPEG signal is not transferred to the output. In case that a genuine original copy-protected MPEG bitstream is accompanied by a valid authenticate signal 10, the switch 2 is closed and the bitstream will be decoded. Home-recorded material that is not copy protected will be detected as such, and the switch will be closed.

The consequences of removing a slice header are that the q-scale parameters must be adapted and the Macro-Block addresses must included. Such changes in the MPEG stream will in the long-run result in incorrect buffer contents. To ensure proper operation, further modifications are needed.

Figure 3:
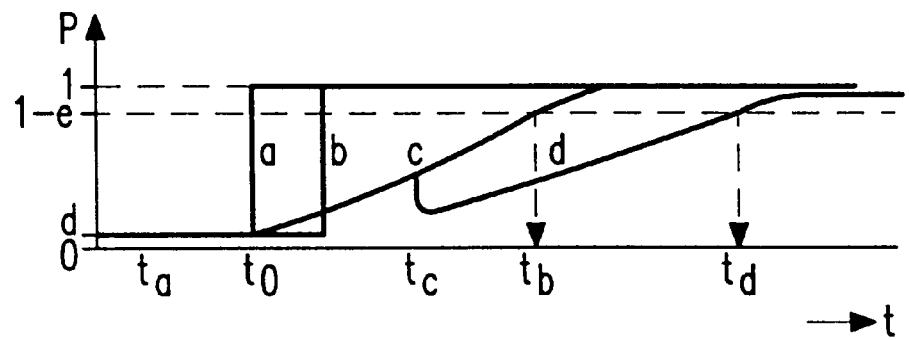
FIG. 3 shows a timing diagram to illustrate the operation of the method according to the invention.

FIG. 3 diagrammatically shows the probability P that a disk is an illegal copy given the observed MPEG bitstream. Playback of the disk starts at $t=t_a$, the first PES header arrives at $t=t_0$. If a hacker or pirate does not remove or modify the conventional copy bit, a fraudulent disk is recognised immediately when the basic engine receives the next PES header (curve a). If the bit is modified but the hash function is not removed, the fake is discovered with certainty a little later (curve b). If a more sophisticated hacker removes the hash check, but not the watermark, it can be decided at $t=t_b$ that the copy is fake with probability 1-e (curve c). If the hacker also manages to corrupt a portion of the watermark (at $t=t_c$) or if the content provider included incorrect watermarks (e.g. if audio bytes simulate F or S sequences), the illegal copy is recognized later. Typically, e will be chosen very small to avoid that home videos accidentally simulate a copy protection watermark (false alarm). The discovery time $t_d-t_0$ is to be designed sufficiently small, without compromising the probability that an MPEG sequences generated by a random coder and randomly chosen content simulates the watermark.

In another embodiment of the invention, the watermark consists of specific values chosen in the Quantization Matrix. The quantization matrix can be evaluated simply by checking for an MPEG sequence header. The matrix, if present, is found after skipping 62 bits. A specific bit after the header byte indicates whether the matrix is present or not. In the latter case, default values are considered.

Watermarks can also be embedded in audio signals. For each frame of audio (24 msec), 4 quantization bits are specified for each subband (maximum of 32 subbands).

An application of copy protection of storage media, for example Multi-Media CDs, will now be described. The proposed copy protection scheme uses a combination of a medium marker (wobble key) that indicates whether the disk is recordable or a read-only professionally mastered MM-CD, and a content marker that indicates whether the content is copy protected. The content marker is a set of marks, comprising a copy bit, a hash function over other data plus the copy bit, and a watermark as described herein before. If the hash function is present (which may be not the case in home videos), the CD player/recorder checks whether the hash function matches the content with the copy bit being set to "protected". The hash function and watermark are included to make erasure of the copy bit technically more difficult. The hash function can be omitted from the bitstream but that requires at least remultiplexing and redefinition of PES lengths. Erasing the watermark requires at least partial transcoding of the MPEG audio or video content.

Figure 4:
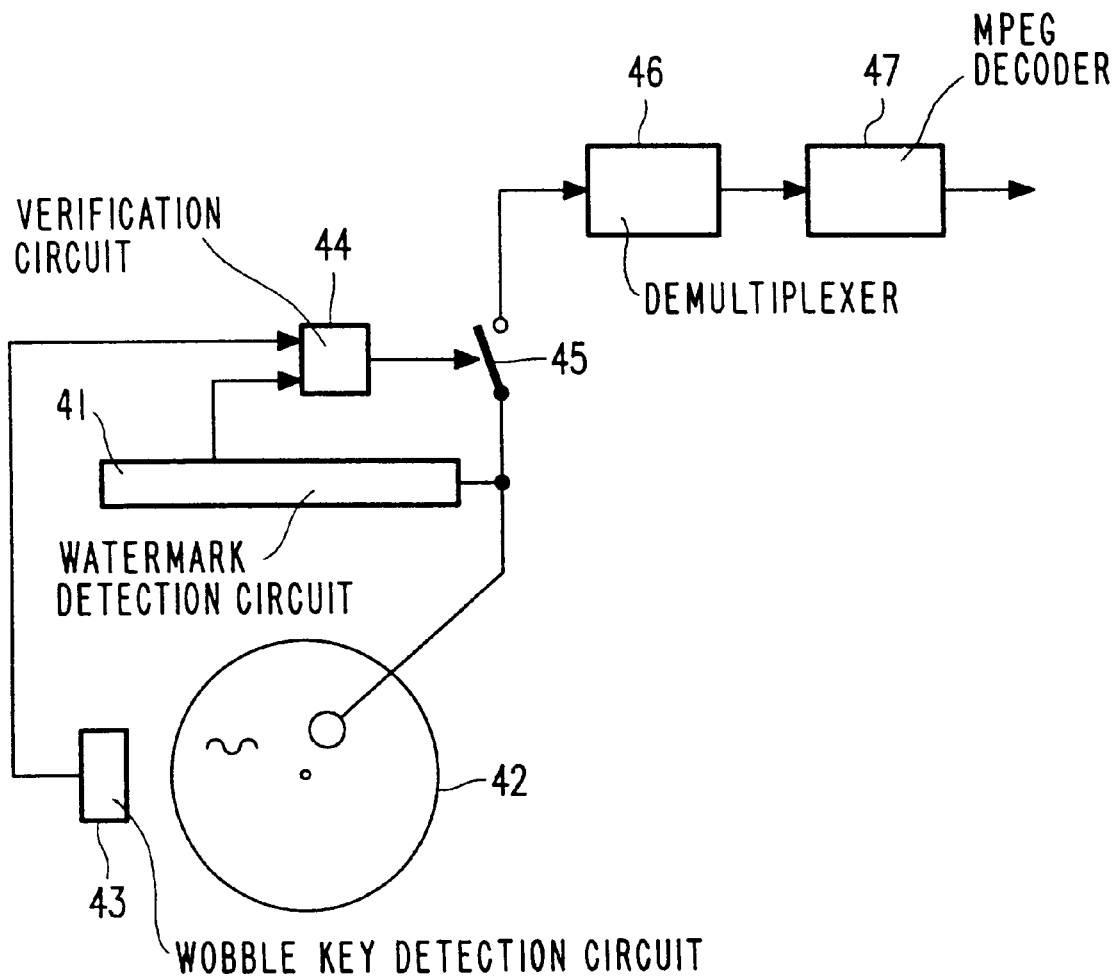
FIG. 4 shows an embodiment of a disc-player comprising the decoder shown in FIG. 2.

With reference to FIG. 4, a watermark detection circuit 41 searches for a watermark embedded in the bitstream which is read from CD 42. A wobble key detection circuit 43 verifies the presence of a wobble key. The circuit 43 may be included in the control loop of the CD drive, or measure the reflectivity of the disc. A verification circuit 44 performs a simple boolean operation which is given in the following Table. If either a watermark is present with correct wobble groove keys, or no watermark is present, then MPEG bitstream is applied to a demultiplexer 46 and MPEG decoder 47 by closing a switch 45. If the watermark is present, but no corresponding wobble is present, the CD reader blocks the content, by opening the switch 45.

|  | Wobble key indicative for: | |
| --- | --- | --- |
|  | Digital Video Disk | Recordable Disk |
| Copy bit, or Hash, or Watermark present and OK | pass signal | block signal |
| Copy bit, or Hash, or Watermark absent or false | pass signal | pass signal |

In summary, an electronic watermarking scheme is proposed that can significantly increase the security of copy protection mechanisms. The watermarking methods works at high level in the hierarchy of the (MPEG) source signal. This ensures that the watermark is easily detectable, but difficult to erase without significant transcoding effort. Such transcoding is considered a difficult and expensive task that may furthermore lead to loss of quality or increase in bit rate.

What is claimed is:

1. A method of watermarking a digitally encoded signal which is decoded prior to being displayed, comprising the steps of:

assigning a predetermined value to a selected encoding parameter of a digitally encoded signal having a plurality of coding parameters, the selected encoding parameter relating to encoding a signal and which, when modified, requires at least two other encoding parameters of the signal to be modified in order to maintain the format of the signal or prevent errors in the decoding of the signal; and encoding the signal with the predetermined value so as to produce a detectable watermark in the signal which prevents copying of the signal and that cannot be removed unless the signal is decoded and reencoded without the predetermined value.

2. The method as claimed in claim 1, wherein the digitally encoded signal is an MPEG signal, and wherein the predetermined value is the number of slices in a frame.

3. The method as claimed in claim 2, wherein successive frames alternately comprise a modulo-N and a modulo-M number of slices in which N and M are integers.

4. The method according claim 3, wherein N and M have different values.

5. A method of decoding a digitally encoded signal which has been encoded by setting an encoding parameter to a predetermined value, comprising the steps of:

detecting, in the digitally encoded signal, the predetermined encoding parameter used to encode the signal;

preventing copying of the digitally encoded signal if the signal contains the predetermined value; and decoding the digitally encoded signal if the signal does not contain the predetermined value.

6. The method as claimed in claim 5, wherein the digitally encoded signal is an MPEG signal, and wherein the predetermined value is the number of slices in a frame.

7. The method as claimed in claim 6, wherein successive frames alternately comprise a modulo-N and a modulo-M number of slices in which N and M are integers.

8. The method according claim 7, wherein N and M have different values.

9. An encoder for watermarking a digitally encoded signal which is decoded prior to being displayed, the encoder comprising;

assigning means for assigning a predetermined value to a selected encoding parameter of a digitally encoded signal having a plurality of coding parameters, the selected encoding parameter relating to encoding a signal and which, when modified, requires at least two other encoding parameters of the signal to be modified in order to maintain the format of the signal or prevent errors in the decoding of the signal; and encoding means for encoding the signal with the predetermined value so as to produce a detectable watermark in the signal that cannot be removed unless the signal is decoded and reencoded without the predetermined value.

10. A decoder for decoding a digitally encoded signal which has been encoded by setting an encoding parameter to a predetermined value, the decoder comprising:

detecting means for detecting, in the digitally encoded signal, the predetermined encoding parameter used to encode the signal;

preventing means for preventing copying of the digitally encoded signal if the signal contains the predetermined value; and decoding means for decoding the digitally encoded signal if the signal does not contain the predetermined value.

11. A system comprising:

an encoder which to assigns a predetermined value to a selected encoding parameter of a digitally encoded signal having a plurality of coding parameters and encode a signal which is decoded prior to being displayed with the predetermined value so that, when modified, at least two other encoding parameters of the signal must be modified in order to maintain the format of the signal or prevent errors in the decoding of the signal so as to produce a watermark in the signal, the encoding parameter relating to encoding the signal; and an electronic storage medium which stores the signal encoded by the encoder.

12. A system as claimed in claim 11, wherein the encoded signal is an MPEG signal, and wherein the predetermined value is the number of slices in a frame.

13. A system as claimed in claim 12, wherein successive frames of the MPEG signal alternately comprise a modulo-N and a modulo-N number of slices in which N and M are integers.

14. The system according claim 13, wherein N and M have different values.

15. A system comprising:

an encoder for assigning a predetermined value to a selected encoding parameter and for encoding a signal with the predetermined value so as to produce a watermark in the signal, the encoding parameter relating to encoding the signal;

an electronic storage medium which stores the signal encoded by the encoder; and an electronic device which reads the encoded signal from the electronic storage medium, which decodes the signal if the predetermined value is not detected, and which prevents decoding of the signal if the predetermined value is detected.

* * * * *